United States Patent [19]

Rothenhöfer

[11] Patent Number: 5,345,502
[45] Date of Patent: Sep. 6, 1994

[54] ESTABLISHMENT OF CONNECTIONS BETWEEN TERMINALS FOR MOBILE SUBSCRIBERS OF AN INTERCONNECTED NETWORK

[75] Inventor: Karl Rothenhöfer, Leonberg, Fed. Rep. of Germany

[73] Assignee: Alcatel N.V., Amsterdam, Netherlands

[21] Appl. No.: 897,371

[22] Filed: Jun. 11, 1992

[30] Foreign Application Priority Data

Jun. 14, 1991 [DE] Fed. Rep. of Germany ....... 4119672

[51] Int. Cl.⁵ ............................................. H04M 3/42
[52] U.S. Cl. ..................................... 379/207; 379/60; 379/211
[58] Field of Search ................. 379/357, 207, 211, 93, 379/94, 58, 60

[56] References Cited

U.S. PATENT DOCUMENTS 4,833,701  5/1989  Comroe et al. ........................ 379/60
4,980,907 12/1990  Raith et al. ............................ 379/63
5,197,096  3/1993  Sakuma et al. ....................... 379/211

OTHER PUBLICATIONS

"Intelligente Netze-leistungsfahige Basis fur Zukunftige Dienste", Telcom Report Bd. 12, Nr. 4, 1989, Munchen de Seiten 102–105, Eske-Christensen et al.
De Sádaba, "Personal Communications in the Intelligent Network", British Telecommunications Engineering, 1990, pp. 80–83.
Betts et al., "ISDN and Intelligent Network Based Telepoint Service", Electrical Communication, 1990, pp. 85–94.
Ballard et al., "Digital Cellular Mobile–Radio System ECR900", 1990, pp. 17–30.
Athanasopulos et al., "Service Control Point (SCP) for the GSM and Personal Communications Systems", IEEE, 1991, pp. 12–17.

Primary Examiner—James L. Dwyer
Assistant Examiner—Ahmad F. Matar

[57] ABSTRACT

The establishment of a connection between two terminals for mobile subscribers of a private or a virtual private network, where the terminals may be connected anywhere in an interconnected network of a number of private or virtual private networks and public networks. According to the invention, intelligent network functions are assigned to private or virtually private networks, to control these complex tasks. By inserting dialing information that contains a network discriminating identification, a connection is established with a service control point in the private or virtually private network so that the functions of the intelligent network can be used to ascertain the dialing information.

9 Claims, 1 Drawing Sheet

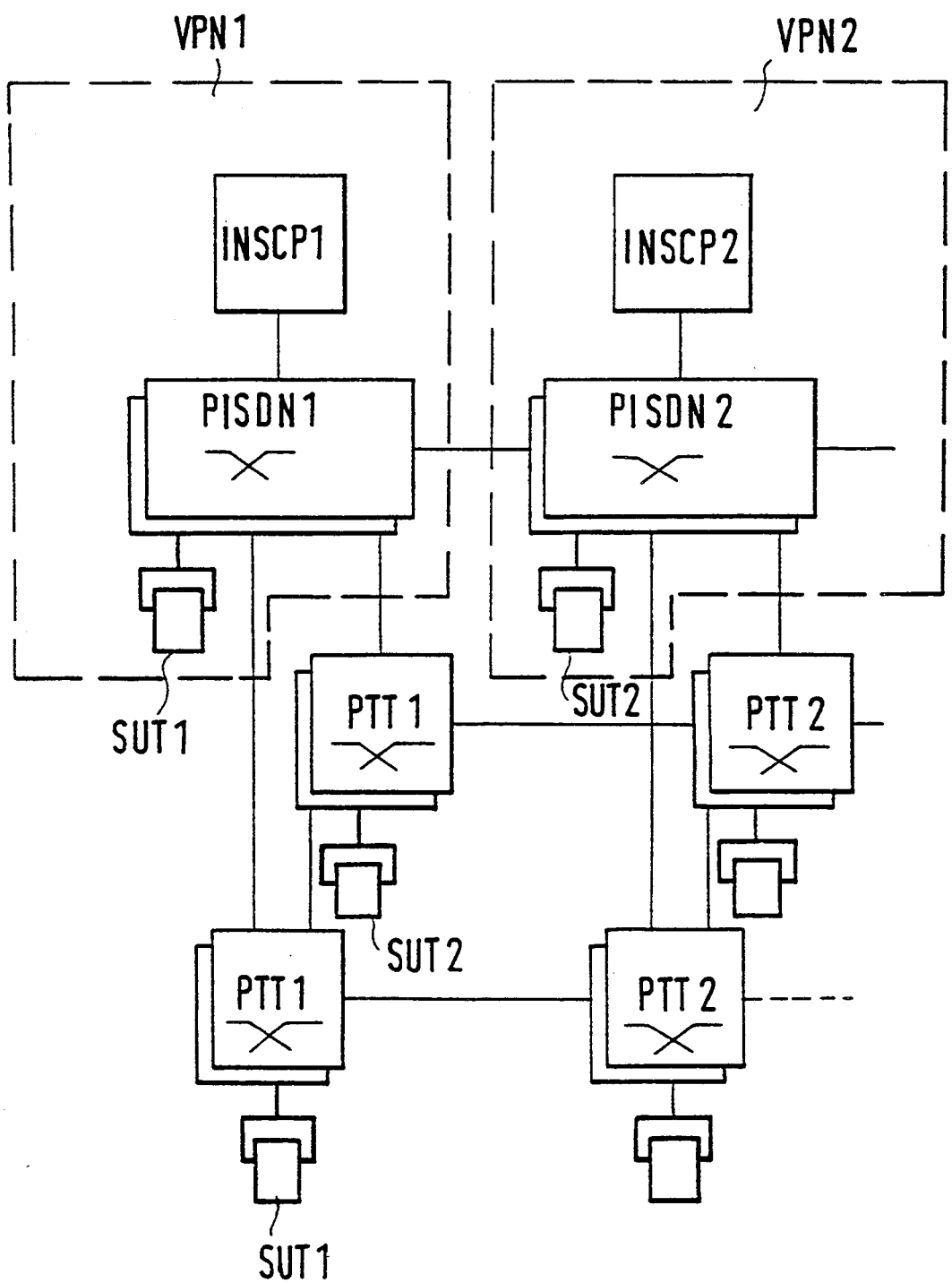

ESTABLISHMENT OF CONNECTIONS BETWEEN TERMINALS FOR MOBILE SUBSCRIBERS OF AN INTERCONNECTED NETWORK

TECHNICAL FIELD

The present invention relates to mobile telecommunication.

BACKGROUND OF THE INVENTION

Subscribers and network operators increasingly require faster and more comprehensive access to existing and new services. This is where the concept of the intelligent network 'IN' is applied. The basic idea is the introduction of a new control level, which centrally contains the service data and logic, and controls development of the services in a telecommunications network.

The standards for such a telecommunications network of the Pan-European digital cellular mobile transmission system GSM (i.e. Group Special Mobile of the CEPT (Conférence Européenne des administrations des Postes et Télécommunications)) were established at the European conference of Mail and Telecommunication Administrations.

To establish a connection for mobile subscribers of this network, after the receiver is lifted or an entitlement card is inserted into a terminal, an identification signal is transmitted to the mobile transmission relay MSC (i.e. GSM Mobile-service Switching Centre), which performs an intelligent network function. The mobile transmission relay requests a so-called visiting location register=VLR and/or a home location register=HLR, and uses these data to establish a connection ("Intelligent Networks—Performance Basis for Future Services", B. Eske—Christensen, K. Schreier, D. Stroh, telecon report 12(1989) Book 4, pages 102-105).

SUMMARY OF THE INVENTION

The present invention has the task of establishing a connection between two terminals for mobile subscribers, even if the terminals are connected to some place in an interconnected network consisting of a number of private and/or virtually private and public networks.

The invention fulfills this task by establishing a connection between two terminals for mobile subscribers of an interconnected plurality of virtual private integrated services networks and public networks, the virtual private networks containing exchanges with associated service control points of an intelligent network the method comprising the steps of entering dialing information into a first terminal, said dialing information containing a network discriminating digit identifying the virtual private network of a desired subscriber; setting up a data path to a service control point of the virtual private network for transmitting the dialing information if the first terminal is connected to the virtual private network, or setting up a data path via an internetwork signaling transfer point to the service control point of the virtual private network for transmitting the dialing information if the first terminal is not connected to the virtual private network; determining the current location of the desired subscriber by means of the service control point using a visiting location register and/or a home location register; determining a path to the desired subscriber with associated dialing information; transmitting the determined dialing information over the data path to the first terminal; and selecting the received dialing information by means of a first terminal.

According to the invention, intelligent network functions are assigned to private or virtually private networks, to control these complex tasks. By inserting dialing information that contains a network discriminating identification, a connection is established with a service control point in the private or virtually private network, so that the functions of the intelligent network can be used to ascertain the dialing information.

In particular, the most favorable connection can be established as a function of a desired service, or as a function of different service fees.

Further advantageous configurations of the object of the invention include setting up a data path by user-to-user signaling over a common signaling channel using the CCITT No. 7 Signaling System; entering the dialing information into the first terminal and adding an identification character specifying a desired service; determining the dialing information in the service control point by evaluating the connection possibilities available only for the desired service; determining the dialing information in the service control point by additionally evaluating the tariff rates to be taken into account for the possible connections; determining the dialing information in the service control point by additionally using a sub-addressing method as specified in CCITT Recommendation I.330 for permitting connections between subscribers of a virtual private network via terminals of a public network and subscribers of further private networks at terminals of the further private networks; and transmitting call-charge information determined for the connection established between the two terminals from the first terminal over the data path to the service control point for tariff and charging administration for the virtual private network.

BRIEF DESCRIPTION OF THE DRAWING

A configuration example according to the invention is explained in the following detailed description, by means of the drawing.

The drawing shows a block circuit diagram for an interconnected network of virtual private and public networks.

BEST MODE FOR CARRYING OUT THE INVENTION

To explain the process according to the invention, we start with an interconnected network of a first virtual private service integrating network VPN1, and a second virtual private service integrating network VPN2, as well as public networks PTT1, PTT2, as shown in the figure.

Both virtual private networks VPN1 and VPN2 contain relay stations PISDN1 and PISDN2, to which service control points INSCP1, INSCP2, i.e. so-called service control points of an intelligent network, are assigned. The establishment of such intelligent networks, and a description of their general functions, can be found, for example, in "Intelligent Networks" by W. Rink, in Electronic Telecommunications, Berlin 40 (1990), book 5, pages 162-164.

As shown in the figure, terminals SUT1, SUT2 for mobile subscribers are connected in this interconnected network to relay station PISDN1 (i.e. Private Integrated Service Digital Network) of a virtual private network or public networks VPN1 PTT1.

To establish a connection between a first terminal SUT1 and a second terminal SUT2 of a mobile subscriber, dialing information must first be provided to the first terminal SUT1, where the dialing information contains a network discriminating identification that identifies the virtual private network of the intended receiving user.

If we now assume that the first terminal has been connected to the virtual private network VPN1, specified by the network discriminating identification, a data connection is established to the network's service control point INSCP1. It is therefore essential for the terminal SUT1 to contain the corresponding stored information about the pertinent network (whether virtual private or public network).

By contrast, if the first terminal has been connected to a public network relay station, the information stored in the terminal helps to first establish a data connection to a network transmission point, and then a data connection to the assigned service control point INSCP1 of its virtual private network.

The data connection is advantageously established by means of user-to-user-signalling, utilizing the D-channel and a central signalling channel (CCITT Signalling System No. 7). The virtual private service integrating network can proceed accordingly.

The dialing information, provided by the subscriber and transmitted over the established data connection, is now used by the service control point INSCP1 to determine the actual location of the intended receiving user, i.e. the second terminal, by evaluating a so-called visiting location register=VLR and/or a home location register=HLR, and determining a suitable path for the connection and the pertinent dialing information.

Since this is a service integrating network, additional identification for a desired service can be inserted and transmitted to the service control point. In that case, the service control point INSCP1 only considers the connection possibilities that are available for this service.

In addition, the different tariff fees for the possible connections (e.g. depending on the time of day) are taken into consideration, so that the dialing information is interpreted for the most cost effective connection.

If a connection is to be made between a virtual private subscriber, through the terminal of a public network, to a remote virtual private subscriber in a virtual private network, the service control point INSCP1 is able to interpret the dialing information by using subaddressing according to CCITT Recommendation I.330.

Dialing information for reaching the desired receiving subscriber, determined by the service control point INSCP1 while it takes all these parameters into account, is then transmitted over the data connection to the first terminal SUT1, and subsequently dialed (preferably automatically) by the terminal.

To enable the central administration of a fee in a virtual private network, the above named data connection is used to transmit the information of the fee, charged to the first terminal for this connection, to the service control point INSCP1.

Instead of the virtual private networks described earlier, connections can also be made in the same way in private networks.

As described earlier, a connection can be made between terminals for mobile subscribers, by introducing a network discriminating identification and utilizing the intelligent network functions assigned to private or virtual private networks, and taking the different parameters into consideration (type of service, fees, etc.). In addition, a centralized fee administration is made possible for the private or virtual private networks.

I claim:

1. A method of establishing a connection between two terminals (SUT1, SIFt2) for mobile subscribers of an interconnected plurality of virtual private integrated services networks (VPN1, VPN2) and public networks (PTT1, PTT2), the virtual private networks (VPN1, VPN2) containing exchanges (NISDN1, NISDN2) with associated service control points (INSCP1, INSCP2) of an intelligent network, comprising the following steps:

entering dialing information into a first terminal, said dialing information containing a network discriminating digit identifying the virtual private network of a desired subscriber;

setting up a data path to a service control point (INSCP1) of the virtual private network (VPN1) for transmitting the dialing information if the first terminal is connected to the virtual private network (VPN1), or setting up a data path via an internetwork signaling transfer point to the service control point (INSCP1) of the virtual private network for transmitting the dialing information if the first terminal is not connected to the virtual private network (VPN1);

determining the current location of the desired subscriber by means of the service control point (INSCP1) using a visiting location register or a home location register;

determining a path to the desired subscriber with associated dialing information;

transmitting the determined dialing information over the data path to the first terminal (SUT1), and selecting the received dialing information by means of the first terminal.

2. A method of establishing a connection, as claimed in claim 1, further comprising the step of:

setting up a data path by user-to-user signaling over a common signaling channel using the CCITT No. 7 Signaling System.

3. A method of establishing a connection, as claimed in claim 2, further comprising the steps of:

entering the dialing information into the first terminal and adding an identification character specifying a desired service, and determining the dialing information in the service control point (INSCP1) by evaluating the connection possibilities available only for the desired service.

4. A method of establishing a connection, as claimed in claim 3, further comprising the step of:

determining the dialing information in the service control point (INSCP1) by additionally evaluating the tariff rates to be taken into account for the possible connections.

5. A method of establishing a connection, as claimed in claim 3, further comprising the step of:

determining the dialing information in the service control point (INSCP1) by additionally using a sub-addressing method as specified in CCITT Recommendation I.330 for permitting connections between subscribers of a virtual private network (VPN1, VPN2) via terminals of a public network and subscribers of further private networks at terminals of the further private networks.

6. A method of establishing a connection, as claimed in claim 1, further comprising the step of:
   transmitting call-charge information determined for the connection established between the two terminals from the first terminal over the data path to the service control point (INSCP1) for tariff and charging administration for the virtual private network.

7. A method of establishing a connection, as claimed in claim 1, further comprising the steps of:
   entering the dialing information into the first terminal and adding an identification character specifying a desired service, and
   determining the dialing information in the service control point (INSCP1) by evaluating the connection possibilities available only for the desired service.

8. A method of establishing a connection, as claimed in claim 7, further comprising the step of:
   determining the dialing information in the service control point (INSCP1) by additionally evaluating the tariff rates to be taken into account for the possible connections.

9. A method of establishing a connection, as claimed in claim 7, further comprising the step of:
   determining the dialing information in the service control point (INSCP1) by additionally using a sub-addressing method as specified in CCITT Recommendation I.330 for permitting connections between subscribers of a virtual private network (VPN1, VPN2) via terminals of a public network and subscribers of further private networks at terminals of the further private networks.

* * * * *

UNITED STATES PATENT AND TRADEMARK OFFICE
CERTIFICATE OF CORRECTION

PATENT NO.   : 5,345,502
DATED        : September 6, 1994
INVENTOR(S)  : K. Rothenhöfer It is certified that error appears in the above-indentified patent and that said Letters Patent is hereby corrected as shown below:

At column 4, line 6 (claim 1, line 2), please change "(SUT1, SIFt2)" to --(SUT1, SUT2)--.

Signed and Sealed this

Eighteenth Day of April, 1995

*Attest:*

BRUCE LEHMAN

*Attesting Officer*  *Commissioner of Patents and Trademarks*